Patented Nov. 15, 1932

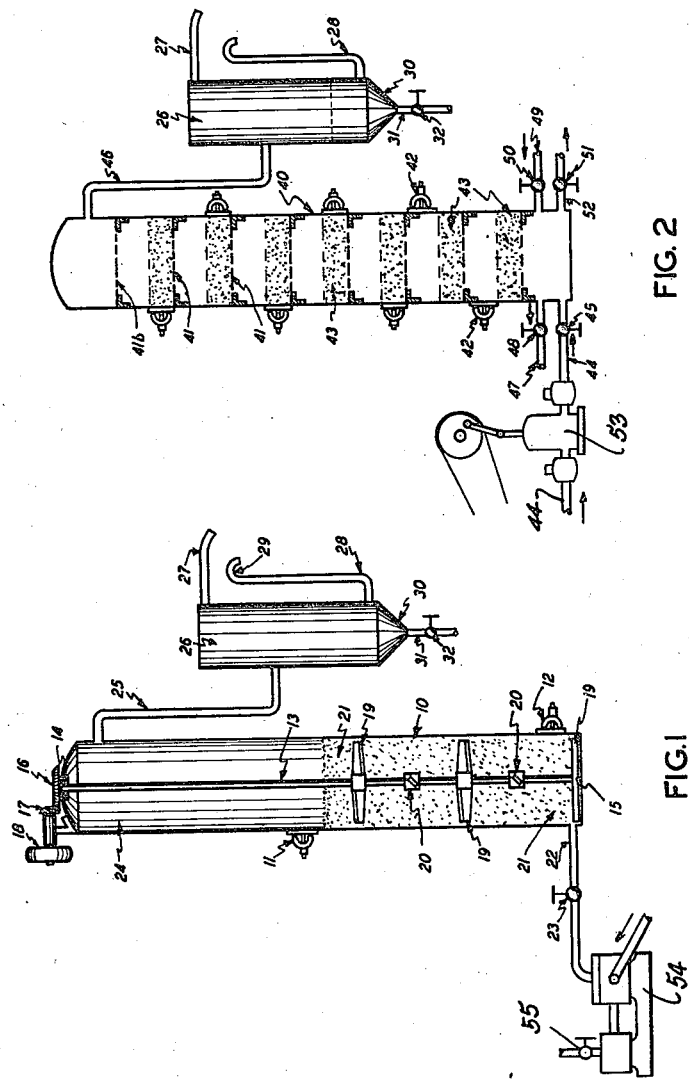

1,887,774

UNITED STATES PATENT OFFICE

GOTTHOLD HARRY MEINZER, OF LOS ANGELES, CALIFORNIA, ASSIGNOR TO L. BLAKE-SMITH, OF SAN FRANCISCO, CALIFORNIA

METHOD OF TREATING EMULSIONS

Application filed July 30, 1930. Serial No. 471,628.

My invention pertains to the art of resolving or breaking emulsions composed principally of oil and water and particularly, though by no means solely, to such treatment of petroleum emulsions.

An object of my invention is to cheaply and expeditiously resolve such emulsions by treating them with certain finely comminuted solids which are substantially insoluble in and chemically inert toward the emulsion and which, for that reason, are not consumed in the treatment, but may be separated and indefinitely reused.

An object of my invention is to minimize the cost of applying the said solids to the emulsion by passing the emulsion in a flow stream through retained bodies of the reagent material permanently positioned, thus avoiding all handling of the solids.

An object of my invention is to provide means for keeping these retained bodies of reagent in such gentle motion as will provide for renewed contacts between the constituents of the reagents and the particles of emulsion and will permit finely divided foreign solids or colloids to pass through the reagent bodies.

An object of my invention is to treat the emulsion in a continuous closed cycle, out of contact with air and protected from evaporation of volatile constituents.

An object of my invention is to provide means for continuously separating the coalesced products of demulsification and to prevent their re-emulsification during their withdrawal from the treating vessel.

The emulsions herein referred to consist of mixtures of oil and water, one of these liquids being very finely subdivided and the particles suspended in a continuous liquid mass of the other. In some cases the subdivision of the disperse phase is maintained merely by the surface tension of the films of liquid of the continuous phase adsorbed on the surfaces of the dispersed particles, in other cases viscous liquids, colloids or finely divided solids are carried in the interfaces and form films or skins surrounding the liquid particles. Also in many cases finely divided solids (such as clay or shale in oilfield emulsions) are mechanically entrained and suspended along with the emulsion particles proper. When such emulsions are broken by the penetration of the skins and the coalescence of the dispersed liquid particles I obtain as product a mixture of the two liquids together with the material of the emulsion skin and any further solid matter which may have been present, the dispersed liquid now being in drops or masses of such size as to readily separate from the continuous phase by gravitation.

In the class of treatments to which my invention is directed, these emulsions are broken by contacting them simultaneously with the two finely divided solid materials, one having a preferential surface attraction or "wettability" for water, the other a preferential attraction for oil. A considerable number of such materials is known and their selection and preparation are described in detail in my co-pending application entitled Method of resolving emulsions, filed July 30, 1930, under Serial No. 471,627, but for the purpose of describing my present invention, it is sufficient to state that such a material as quartz or silica, reduced to say 60/80 mesh, is a suitable water-wettable material and iron sulfid or pyrite reduced to the same mesh a suitable oil-wettable material. These bodies are substantially insoluble in the emulsion and function by drawing apart the aqueous and the oily elements and coalescing them into masses of such size as to readily stratify. The solid materials, if kept clean and free from accumulation of colloidal emulsifying agents or other incidental bodies, may be retained in the apparatus and will continue to function indefinitely.

Other objects and advantages of my invention will be evident on inspection of the attached drawing and the following description thereof, in which, Fig. 1 is an internal elevation of a modification of my invention in which the mass of solid reagent is kept in motion by mechanical means, and, Fig. 2 is an internal elevation of a modification of my invention in which the solid reagent is kept in motion by the movement of the emulsion therethrough.

Referring to Fig. 1, 10 is a long and narrow vertical cylindrical shell having a manhole 11 situated about midway its height, this manhole being for the purpose of charging the shell with solid material and a manhole 12 located near the bottom of the shell for the purpose of withdrawing reagent and cleaning the shell as required.

Within the shell I place a vertical shaft 13 passing through a stuffing box 14 in the upper end of the shell and seated in a suitable bearing 15 in the bottom. This shaft is provided with a bevel gear 16 actuated by a bevel pinion 17 revolved by means of a belt pulley 18 or other suitable mechanical means from a source of power not shown. The proportions of the various power transmitting devices, the one shown being suggestive only, should be such that the shaft 13 will revolve very slowly, say one revolution per minute.

Along the length of that portion of the shaft situated below manhole 11 I place a number of scrapers or plows 19 and 20, these being firmly keyed to the shaft. It will be understood that the plows 19 and 20 are identical, those indicated at 19 being shown in side elevation and those at 20 in end elevation. The shell being filled with the solid comminuted material to substantially the level of manhole 11, as indicated at 21, the slow revolution of the plow through the mass of material keeps it in slight motion. The plows should be set at a slight angle to the horizontal so as to impart a lifting motion rather than a revolving motion through the mass of pulverized material and that lift should be relatively slight, that is to say the trailing edge of the plow may be from one-half inch to one inch higher than the forward edge. By the slow revolution of these plows, which should be set alternately at an angle of 90°, the entire mass of comminuted solid material is maintained in slow and gentle movement and the grains of which it is composed are caused to work over each other and to constantly change their relative positions and points of contact.

A supply of the emulsion to be broken is continuously admitted at substantially the bottom of the apparatus through a pipe 22 controlled by a valve 23, this pipe being supplied by a pump 54 or other means for producing a continuous flow stream of the emulsion under pressure. The emulsion passes into the mass of solid reagent indicated at 21 and by contact with the moving mass of reagent is caused to separate into its constituents, to-wit, oil, water and fine or colloidal solids. Passing out of the upper surface of the reagent bed this mixture fills the upper portion 24 of the cylindrical shell and overflows through a pipe 25, which passes to the separating tank 26. The provision of a space equal to perhaps one-half the capacity of the shell is for the purpose of allowing any grains of the reagent material, which may be entrained in the oil, to subside and drop back on to the top of the bed.

The provision of this vacant space obviates any requirement for filtering the reagent from the demulsified oil and water. The fine solids, which may have been an original constituent of the oil, will be carried over with the oil or the water or both.

The mixture of oil and water should enter the separating chamber 26 at a point about midway its height. From the side of this separating chamber, at or near its top, I take an oil overflow pipe 27 and from the side of the chamber, at or near its bottom, I take a water overflow pipe 28. The separating chamber should have sufficient capacity to permit the water which leaves the emulsion breaking shell in the form of coarse globules and drops to completely subside from the oil so that the overflow pipe 27 should deliver only clean oil. Likewise the water overflow pipe 28 will deliver only clean water, or water containing suspended fine solids. The height of the water overflow up to the point indicated at 29 should be less than the height of the oil overflow, inasmuch as the column of water filling the pipe 28 is of greater density than the column consisting partly of water and partly of oil which is in balance with it in the separator. This device will deliver continuously completely separated products so long as its settling capacity is not exceeded. The point of overflow 27 of the separator should be substantially level with the point of overflow of the emulsion breaking shell, as indicated in the drawing to avoid any possibility of turbulence in the passage of oil and water through the pipe 25, such turbulence tending to cause re-emulsification of the once separated constituents.

As a certain amount of solid matter is likely to settle out in the separator it is desirable to provide this shell with the conical bottom indicated at 30, and with a drain pipe 31, controlled by valve 32 through which mud, which might otherwise choke pipe 28, may be occasionally withdrawn.

The modification of my invention illustrated in Fig. 2 comprises a similar vertical shell 40 provided at intervals along its height with screen members 41 by which it is divided into chambers. These screens should be of sufficient strength and stiffness to support layers of the comminuted solid reagent, these reagents being inserted through the manhole 42 and being of sufficient thickness to fill perhaps half the height of each chamber, as indicated at 43. The material of which these screens are composed should be just sufficiently fine in mesh to prevent the solid reagent material from passing downwardly and it is also desirable that the reagent should be of rather coarse mesh, as say that passing a 60 mesh screen and retained on an 80 mesh screen and should be carefully freed from fines. No reagent is placed on the upper screen 41—b, which is designed solely to prevent loss of reagent by flotation.

At substantially the bottom of the apparatus I place an emulsion inlet pipe 44 controlled by a valve 45, this pipe communicating with a pump 53 or other means not shown for supplying a pulsating flow stream of the emulsion to be treated. The emulsion fills the shell, passing upwardly through each of the reagent layers 43 in turn and being separated into its constituents in these layers. The mixture of constituents, no longer emulsified but in condition to settle, passes out of the apparatus through the overflow pipe 45 and into a separator 46, which may be identical with that referred to in the description of Fig. 1 and need not be further described.

In passing upwardly through the relatively shallow layers of comminuted reagent material the flow of emulsion tends to keep the reagent in gentle movement, but this movement may not be sufficient to cause the finely divided solids which are often present in the emulsion to pass through the beds and out of the apparatus. There will therefore be a tendency for the supporting screens to become coated on their lower side with these finely divided solids, which may also penetrate into the lower portion of the mass of the reagent material and thus choke off and prevent the continuous upward flow of the emulsion through the apparatus. To care for this contingency I have provided an emulsion outflow pipe 47, controlled by valve 48. This pipe should be conducted into a sump from which emulsion can be picked up by the supply pump and passed back into the apparatus as convenient.

When the screens or the lower portions of the beds of reagent show signs of becoming choked with the said finely divided solids, valve 45 may be closed and valve 48 momentarily thrown wide open. By this means the direction of flow of emulsion through the apparatus is reversed and any solids collected on or in the lower side of each bed will be washed back into the chamber immediately below. By this simple means the beds may be cleaned out as often as may be desired and the flow rate of the apparatus reestablished.

In the course of long continued use of the same beds of reagent material they may become choked or coated with colloidal or other fine foreign matter to such an extent that the reversal of flow of the normal contents of the shell will not suffice to clean them. When this condition arises the shell may be substantially drained of its contents by opening valve 48 and may then be strongly washed, usually by admitting a stream of water under high pressure through the pipe 49 controlled by the valve 50. Washing with water in this manner may be continued as long as desired, the water being drawn from the separator by opening valve 32. The beds may also be washed downwardly by filling the shell with water, closing valve 50 and opening valve 51, controlling a pipe 52 which leads to any drain. The same pipe and valve may be used for finally freeing the apparatus from water preparatory to reestablishing the flow of emulsion through it.

The washing effect may be highly accelerated by dispersing in the wash water a small amount of bentonite or other water-dispersible colloid. The effect of this colloid is to rapidly free the solid grains from the oil skins and other matter adhering to them and thus greatly hasten the purification of the reagent bed.

Where mechanical stirring is dispensed with, the extent of movement of the grains of reagent in the bed is a function of the velocity of the emulsion column and, in apparatus of large size, it may be difficult to maintain a sufficient velocity without exceeding the resolving capacity of the apparatus unless the shell is relatively high and narrow. This difficulty may be obviated by interrupting the flow of emulsion through the apparatus at very short intervals, as by means of a mechanically rotated stop cock placed in the emulsion feed pipe 44, or, better still, by feeding the emulsion to this pipe by means of the well known single acting pump, which takes suction on the inward stroke and discharges on the outward. By either of these means a pulsating movement of the emulsion column is effected, this movement being highly effective in producing a disturbance in the bed of reagent grains without tending to lift the grains entirely out of the bed.

It is permissible, and in many cases desirable, to warm the emulsion prior to feeding it into the apparatus, as is well known in many demulsification processes heretofore used. The main purpose of raising the temperature being to lower the viscosity of the oil phase, the temperature preferred would be such as would reduce the emulsion to a fluent condition, but in no case should such temperature exceed the boiling point of water or the temperature at which the separated oil content will lose a material proportion of vapor on exposure to the air.

I claim as my invention:

1. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; means for separating entrained grains of said solid substances from a rising column of mixed products of the resolution of said emulsion; automatic means for producing a relative movement of the constituent grains of said mass in excess of the movement produced by the continuous flow of emulsion therethrough; means at substantially the upper end of said shell for withdrawing said products, and means for parting said products.

2. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; an enclosure of space above said mass adapted to permit entrained grains of said solid substances to subside from a rising column of mixed products of the resolution of said emulsion; automatic means for producing a relative movement of the constituent grains of said mass in excess of the movement produced by the continuous flow of emulsion therethrough; means at substantially the upper end of said shell for withdrawing said products, and means for parting said products.

3. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; filter means arranged to separate entrained grains of said solid substances from a rising column of mixed products of the resolution of said emulsion; automatic means for producing a relative movement of the constituent grains of said mass in excess of the movement produced by the continuous flow of emulsion therethrough; means above said filter means for withdrawing said products, and means for parting said products.

4. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; filter means adapted to separate entrained grains of said solid substances from a rising column of mixed products of the resolution of said emulsion; means for reversing the direction of movement of said column for cleaning said filter means; automatic means for producing a relative movement of the constituent grains of said mass in excess of the movement produced by the continuous flow of emulsion therethrough; means above said filter means for withdrawing said products, and means for parting said products.

5. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; means for separating entrained grains of said solid substances from a rising column of mixed products of the resolution of said emulsion; power actuated mixing means for producing relative movement of the constituent grains of said mass; means at substantially the upper end of said shell for withdrawing said products, and means for parting said products.

6. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; an enclosure of space above said mass adapted to permit entrained grains of said solid substances to subside from a rising column of mixed products of the resolution of said emulsion; power actuated means for producing relative movement of the constituent grains of said mass; means at substantially the upper end of said shell for withdrawing said products, and means for parting said products.

7. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; filter means arraigned to separate entrained grains of said solid substances from a rising column of mixed products of the resolution of said emulsion; power actuated mixing means for producing relative movement of the constituent grains of said mass; means above said filter means for withdrawing said products, and means for parting said products.

8. Apparatus for contacting an oil and water emulsion with granular solid substances having the property of resolving said emulsion into its oil and water constituents, comprising: a substantially closed vessel adapted to retain an incoherent mass of said solid substances; means for continuously introducing emulsion at substantially the lower end of said mass; filter means adapted to separate entrained grains of said solid substances from a rising column of mixed products of the resolution of said emulsion; means for reversing the direction of movement of said column for cleaning said filter means; power actuated means for producing relative movement of the constituent grains of said mass; means above said filter means for withdrawing said products, and means for parting said products.

9. A method of breaking an oil and water emulsion by contacting said emulsion with granular solid substances having the property of resolving said emulsion into its oil and water constituents, comprising: establishing an incoherent mass of said granular substances; passing said emulsion through said mass while mechanically agitating said mass to maintain the grains of said mass in slight relative movement, whereby said emulsion is resolved into its oil and water constituents; separating entrained grains of said granular substances from said constituents by subsidence; returning said grains to said mass, and parting said constituents by a gravity effect.

10. A method of breaking an oil and water emulsion by contacting said emulsion with a plurality of granular solid substances having jointly the property of resolving said emulsion into its oil and water constituents, comprising: establishing an incoherent mass of said granular substances; passing said emulsion through said mass, whereby said emulsion is resolved into its oil and water constituents; separating entrained grains of said granular substances from said constituents by subsidence; returning said grains to said mass, and parting said constituents by a gravity effect.

11. A method of breaking an oil and water emulsion by contacting said emulsion with granular solid substances having the property of resolving said emulsion into its oil and water constituents, comprising: establishing an incoherent mass of said granular substances; passing said emulsion through said mass while mechanically agitating said mass to maintain the grains of said mass in slight relative movement, whereby said emulsion is resolved into its oil and water constituents; separating entrained grains of said granular substances from said constituents, and parting said constituents by a gravity effect.

12. A method of breaking an oil and water emulsion by contacting said emulsion with a plurality of granular solid substances having jointly the property of resolving said emulsion into its oil and water constituents, comprising: establishing an incoherent mass of said granular substances; passing said emulsion through said mass, whereby said emulsion is resolved into its oil and water constituents; separating entrained grains of said granular substances from said constituents, and parting said constituents by a gravity effect.

13. A method of breaking an oil and water emulsion by contacting said emulsion with granular solid substances having the property of resolving said emulsion into its oil and water constituents, comprising: establishing an incoherent mass of said granular substances; passing said emulsion through said mass in a flow stream while maintaining the grains of said mass in slight relative movement by agitation in excess of that produced by the mean velocity of said stream, whereby said emulsion is resolved into its oil and water constituents; separating entrained grains of said granular substances from said constituents by subsidence; returning said grains to said mass, and parting said constituents.

14. A method of breaking an oil and water emulsion by contacting said emulsion with a plurality of granular solid substances having jointly the property of resolving said emulsion into its oil and water constituents, comprising: establishing an incoherent mass of said granular substances; passing said emulsion through said mass, whereby said emulsion is resolved into its oil and water constituents; separating entrained grains of said granular substances from said constituents by subsidence; returning said grains to said mass, and parting said constituents.

15. A method of breaking an oil and water emulsion by contacting said emulsion with granular solid substances having the property of resolving said emulsion into its oil and water constituents, comprising: establishing an incoherent mass of said granular substances; passing said emulsion through said mass in a flow stream while maintaining the grains of said mass in slight relative movement by agitation in excess of that produced by the mean velocity of said stream, whereby said emulsion is resolved into its oil and water constituents; separating entrained grains of said granular substances from said constituents, and parting said constituents.

16. A method of breaking an oil and water emulsion by contacting said emulsion with a plurality of granular solid substances having jointly the property of resolving said emulsion into its oil and water constituents, comprising: establishing an incoherent mass of said granular substances; passing said emulsion through said mass, whereby said emulsion is resolved into its oil and water constituents; separating entrained grains of said granular substances from said constituents, and parting said constituents.

17. Apparatus for contacting an oil and water emulsion with granular solid substances having the property of resolving said emulsion into its oil and water constituents, comprising: a substantially closed vessel adapted to retain an incoherent mass of said solid substances; means for continuously introducing a pulsating stream of emulsion into the lower portion of said vessel; means for separating entrained grains of said solid substances from the mixed products of the resolution of said emulsion; means for withdrawing said products from said shell above said mass, and means for parting said products.

18. A method of breaking an oil and water emulsion by contacting said emulsion with granular solid substances having the property of resolving said emulsion into its oil and water constituents, comprising: establishing an incoherent mass of said granular substances; passing a pulsating stream of emulsion through said mass, whereby said emulsion is resolved into its oil and water constituents; separating entrained grains of said granular substances from said constituents, and parting said constituents.

19. A method of breaking an oil and water emulsion by contacting said emulsion with a plurality of granular solid substances having jointly the property of resolving said emulsion into its oil and water constituents, one of said substances being preferentially wetted by water and the other of said substances being preferentially wetted by oil, comprising: establishing an incoherent mass of said granular substances; passing said emulsion through said mass, whereby said emulsion is resolved into its oil and water constituents; separating entrained grains of said granular substances from said constituents by subsidence; returning said grains to said mass, and parting said constituents by a gravity effect.

20. A method of breaking an oil and water emulsion by contacting said emulsion with a plurality of granular solid substances having jointly the property of resolving said emulsion into its oil and water constituents, one of said substances being preferentially wetted by water and the other of said substances being preferentially wetted by oil, comprising: establishing an incoherent mass of said granular substances; passing said emulsion through said mass, whereby said emulsion is resolved into its oil and water constituents; separating entrained grains of said granular substances from said constituents, and parting said constituents by a gravity effect.

21. A method of breaking an oil and water emulsion by contacting said emulsion with a plurality of granular solid substances having jointly the property of resolving said emulsion into its oil and water constituents, one of said substances being preferentially wetted by water and the other of said substances being preferentially wetted by oil, comprising: establishing an incoherent mass of said granular substances; passing said emulsion through said mass, whereby said emulsion is resolved into its oil and water constituents; separating entrained grains of said granular substances from said constituents by subsidence; returning said grains to said mass, and parting said constituents.

22. A method of breaking an oil and water emulsion by contacting said emulsion with a plurality of granular solid substances having jointly the property of resolving said emulsion into its oil and water constituents, one of said substances being preferentially wetted by water and the other of said substances being preferentially wetted by oil, comprising: establishing an incoherent mass of said granular substances; passing said emulsion through said mass, whereby said emulsion is resolved into its oil and water constituents; separating entrained grains of said granular substances from said constituents, and parting said constituents.

23. A method of breaking an oil and water emulsion by contacting said emulsion with granular solid substances having the property of resolving said emulsion into its oil and water constituents, one of said substances being preferentially wetted by water and the other of said substances being preferentially wetted by oil, comprising: establishing an incoherent mass of said granular substances; passing a pulsating stream of emulsion through said mass, whereby said emulsion is resolved into its oil and water constituents; separating entrained grains of said granular substances from said constituents, and parting said constituents.

In witness that I claim the foregoing I have hereunto subscribed my name this 2nd day of July, 1930.

GOTTHOLD HARRY MEINZER.